United States Patent [19]

Baader

[11] Patent Number: 5,089,939
[45] Date of Patent: Feb. 18, 1992

[54] SCHOOL BUS WARNING LIGHT FITTING

[76] Inventor: Joseph E. Baader, 333 Holiday Dr., Springfield, Ohio 45505

[21] Appl. No.: 639,439

[22] Filed: Jan. 10, 1991

[51] Int. Cl.$^5$ .............................................. F21V 17/00
[52] U.S. Cl. ...................................... 362/61; 362/80; 362/368; 362/455
[58] Field of Search ................... 362/61, 83, 80, 83.3, 362/310, 365, 368, 455

[56] References Cited

U.S. PATENT DOCUMENTS

| | | | |
|---|---|---|---|
| 2,979,603 | 4/1961 | Falge | 362/368 |
| 3,968,358 | 7/1976 | Baader. | |
| 4,237,523 | 12/1980 | Moote | 362/61 |
| 4,422,136 | 12/1983 | Newman et al. | 362/61 |
| 4,538,213 | 8/1985 | Martin | 362/61 |
| 4,954,932 | 9/1990 | Isenga | 362/61 |

FOREIGN PATENT DOCUMENTS

| | | | |
|---|---|---|---|
| 220743 | 10/1958 | Australia | 362/80 |
| 657341 | 2/1963 | Canada | 362/61 |
| 176199 | 12/1957 | Netherlands | 362/83 |
| 1042115 | 9/1966 | United Kingdom | 362/61 |

*Primary Examiner*—Ira S. Lazarus
*Assistant Examiner*—Y. Quach
*Attorney, Agent, or Firm*—David H. Semmes

[57] ABSTRACT

School bus warning light systems. Particularly an improved one-piece plastic fitting for supporting the sealed beam bulb in accordance with SAE photometric and durability standards. The fitting is characterized by its simplicity and ruggedness for securing and positioning the sealed beam bulb.

1 Claim, 4 Drawing Sheets

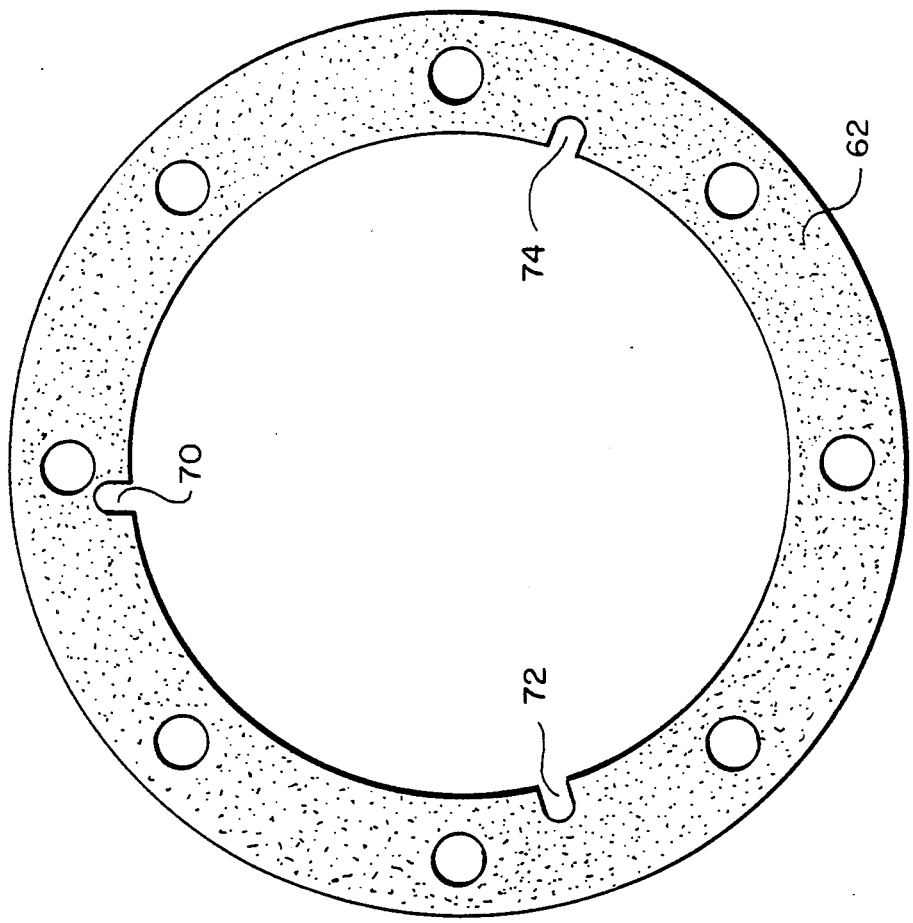
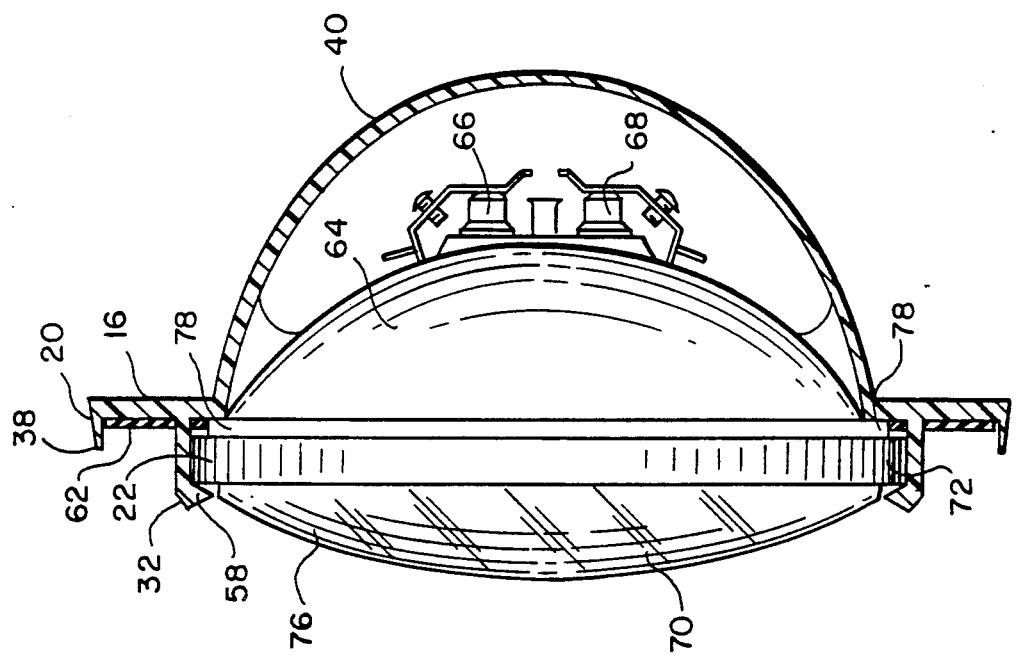

SCHOOL BUS WARNING LIGHT FITTING

CROSS-REFERENCE TO RELATED APPLICATIONS

An improvement upon applicant's WARNING LIGHT ASSEMBLY (U.S. Pat. No. 3,968,358).

BACKGROUND OF THE INVENTION

1. Field of the Invention:

School bus warning lights, particlarly a unitary assembly or fitting for economically and reliably performing in accordance with SAE standards for vibration, moisture, dust, corrosion and photometric alignment.

2. Description of the Prior Art:

Baader, U.S. Pat. No. 3,968,358;
Beaubien, U.S. Pat. No. 2,852,758;
Falge, U.S. Pat. No. 2,979,603;
Woodcook, U.S. Pat. No. 3,025,390;
Worden, U.S. Pat. No. 3,105,642;
Worden, U.S. Pat. No. 3,177,356;
Pawloski, U.S. Pat. No. 3,280,323;
Magi, U.S. Pat. No. 3,651,321.

Applicant's improvement consists in an improved annular body adapted as a fitting for supporting the combination of a lens cover superstructure and the sealed beam bulb assembly.

SUMMARY OF THE INVENTION

Applicant's fitting for vehicular warning lamps comprises an annular body defining on its top a circular rim adapted for supporting a lens cover superstructure and defining at its bottom a circular flange for supporting a general purpose seal beam light or lamp. The top circular rim includes a plurality of individual integrally formed tabs, each tab comprising an elongated shaft extending substantially normally away from the circular rim and with an inwardly directed projection surface on the distal end of the elongated shaft for complemental engagement with an annular retaining flange of the seal beam lamp.

DESCRIPTION OF THE DRAWINGS

FIG. 5 is a side elevation, partially in section, showing the lens fitting with an outwardly and diametrically extending support strap or radius 40.

FIG. 6 is a top plan of a lens sealing gasket.

DESCRIPTION OF THE PREFERRED EMBODIMENTS

Figure 1:
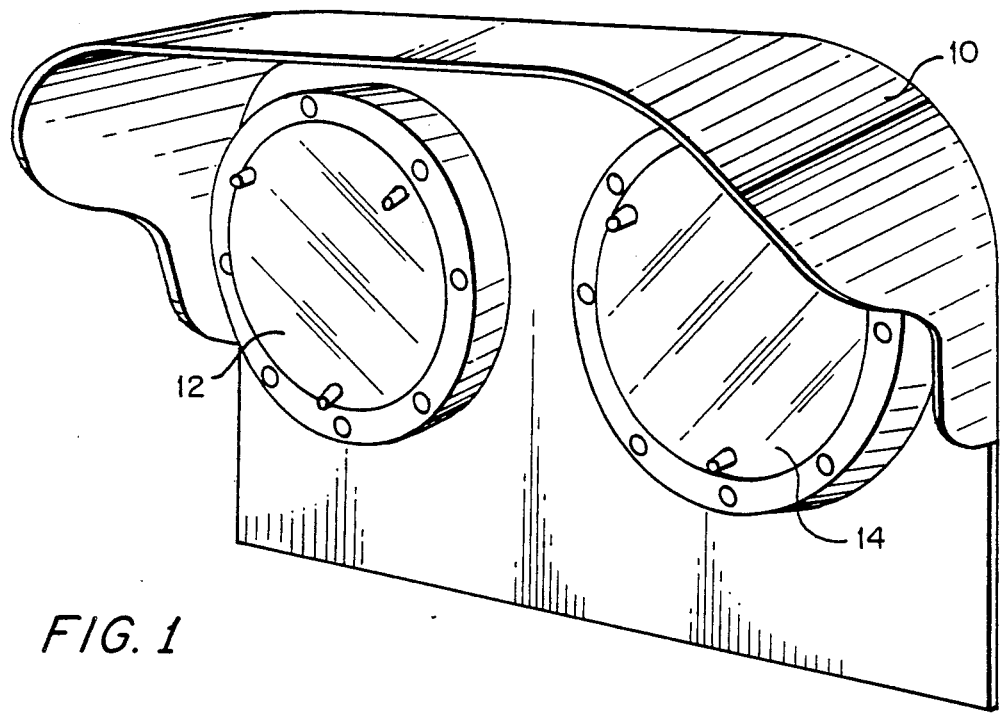
FIG. 1 is a perspective view of a hooded dual warning light assembly, embodying two plastic fittings for warning lamps, according to the present invention.

In FIG. 1, twin hood 10 is illustrated as supporting school bus warning lamps 12 and 14.

Figure 2:
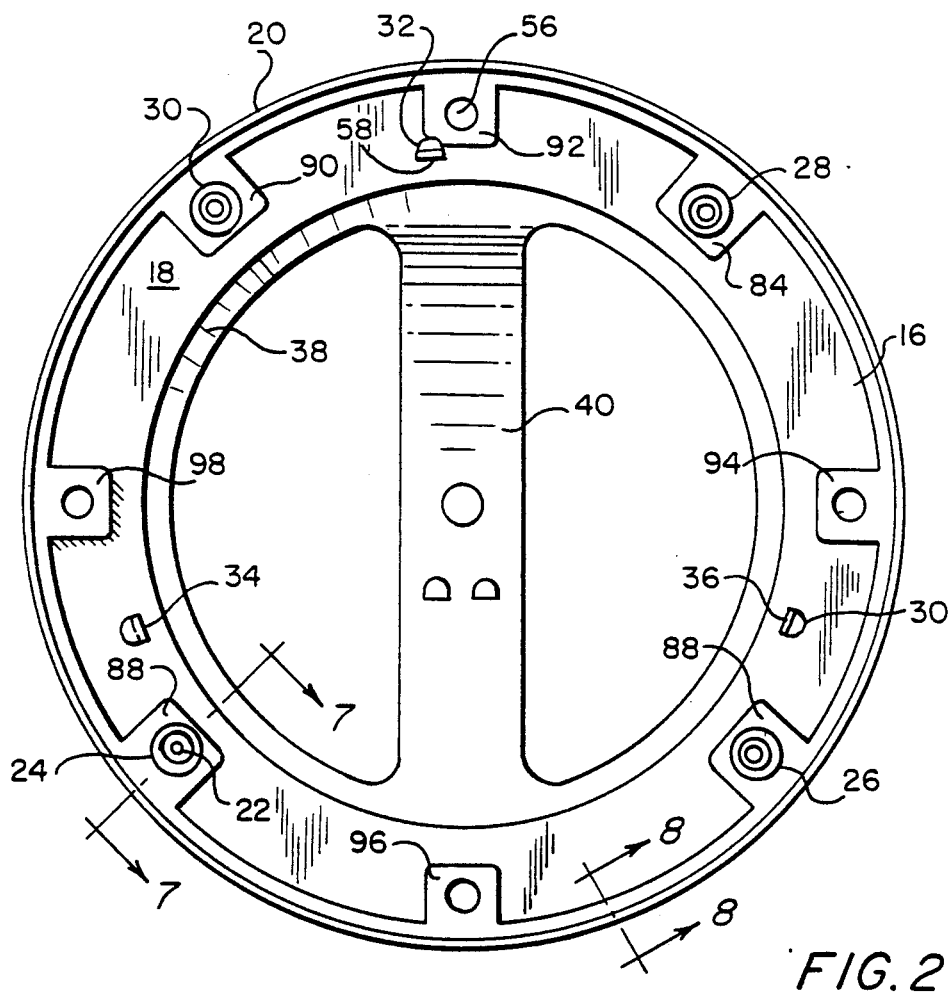
FIG. 2 is a top plan of the plastic fitting.
Figure 4:
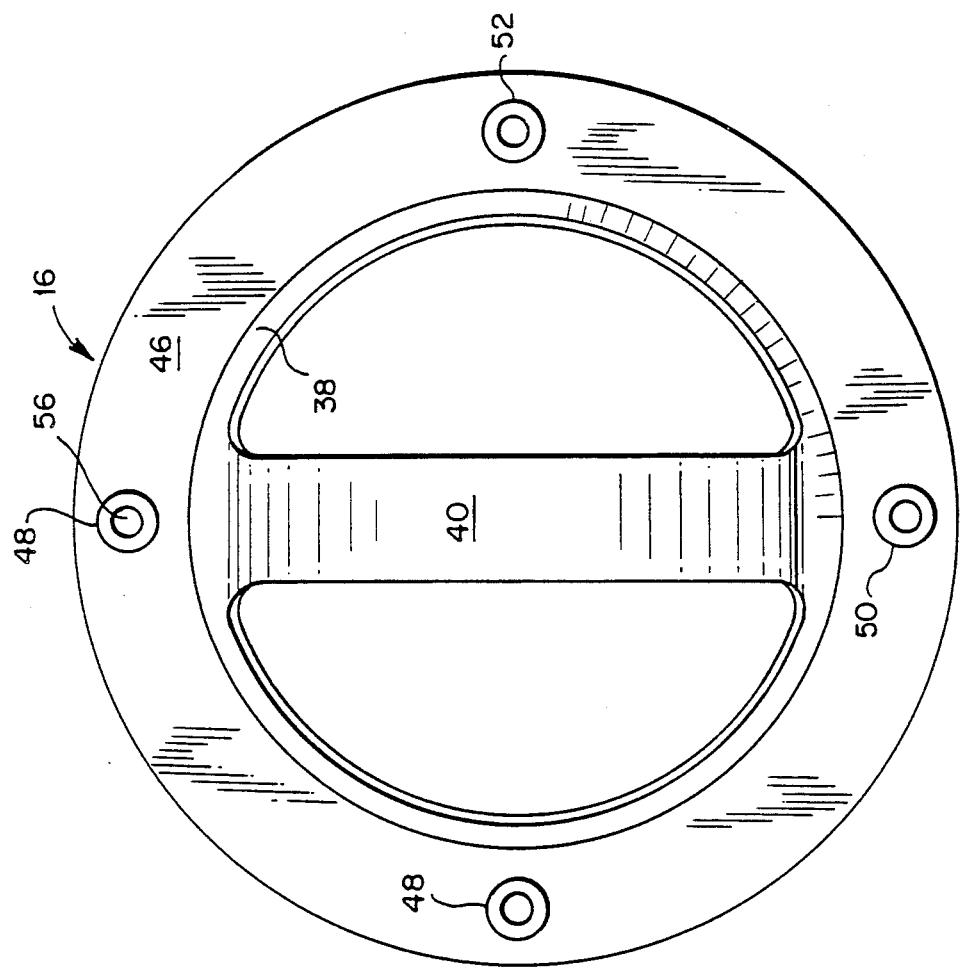
FIG. 4 is a bottom plan.

In FIGS. 2 and 5, applicant's lens fitting is illustrated as a one-piece black UV polycarbonate plastic housing defined as a cup-shaped body 16 having a symmetrical concave inner surface 18 which terminates at a rim generally indicated at 20. The seating plane 78 of lamp 64 is substantially the same diameter as the bottom circular flange 38 so that a gasket 62 is locally compressed. A plurality of integrally formed tabs 32, 34 and 36 each include a shank and an angled shoulder 58 with inner angle 60. Surface 80 extends radially inwardly and is adapted through its inclined configuration to position itself upon annular bulb retaining flange 72, regardless of slight manufacturing tolerances. The elongated shank of tabs 32, 34 and 36 are positioned at a diameter greater than the maximum possible bulb seal diameter, so as to accommodate the seal configuration of various bulb manufacturers. Gasket 62 extends inwardly over concave inner surface 18, and serves both as the seal between inner surface 18 and the lens cover (not illustrated) and a retainer for bulb-retaining flange 72 which is resiliently urged against the angled shoulder of the plastic tabs 32, 34 and 36.

Figure 9:
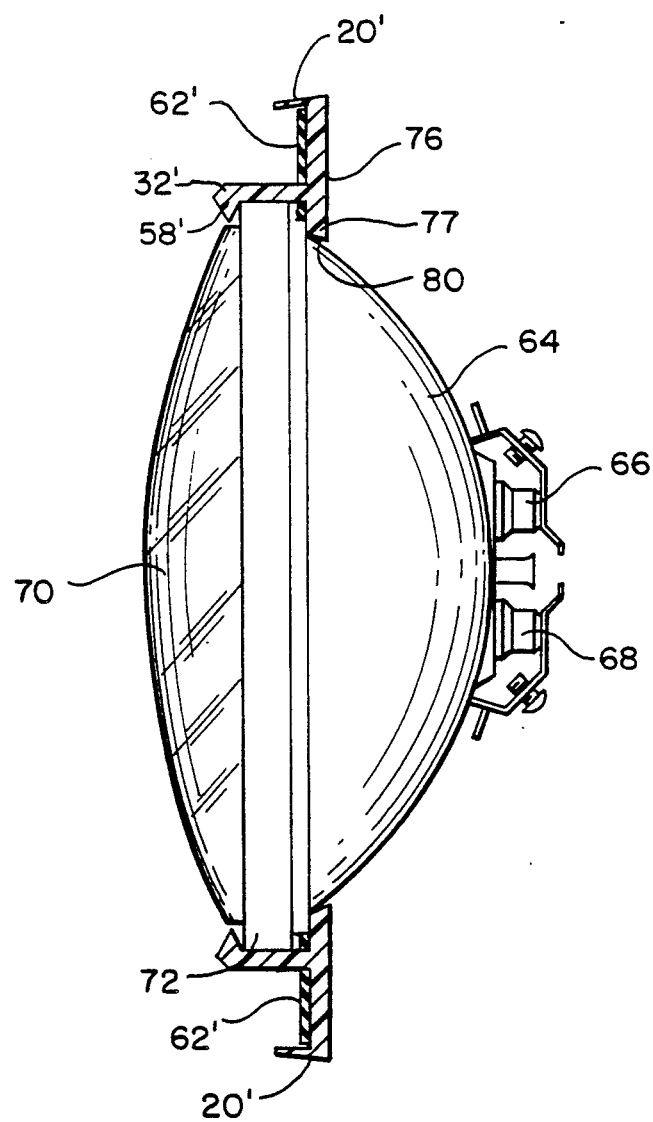
FIG. 9 is a side elevation, partially in section of a modified lens fitting. eliminating the diametrically extending strap 40.

As is apparent in FIGS. 5 and 9, when gasket 62, 62' are not present, lamp 64 will seat directly upon cap-shaped body 16, being resiliently urged thereagainst by contact with the resilient tabs 32, 32' 34 and 36. As a result, while gasket 62 is advantageously employed within the total assembly, the misalignment of gasket 62 and/or its omission, does not defeat the support of the lamp 64 within the housing having outer rim 20, 20'.

As will be apparent in FIG. 2, the arrangement includes aligning bosses 92, 94, 96, and 98. Metallic screws (not illustrated) extend through the lens cover as well as through these bosses exteriors 48, 52, 50 and 46 as at 56 for fastening by conventional lock nuts, or the like.

Conical shaped bosses 24, 26, 28 and 30 are maintained in a series of identical tabs 84, 86, 88 and 90 such that the lamp cover may be secured to the housing by conventional stove bolts and the like extending into the identical tabs 84, 86, 88, and 90. Each tab contains a threaded aperture 22 for engagement with such stove bolts, or the like.

Figure 3:
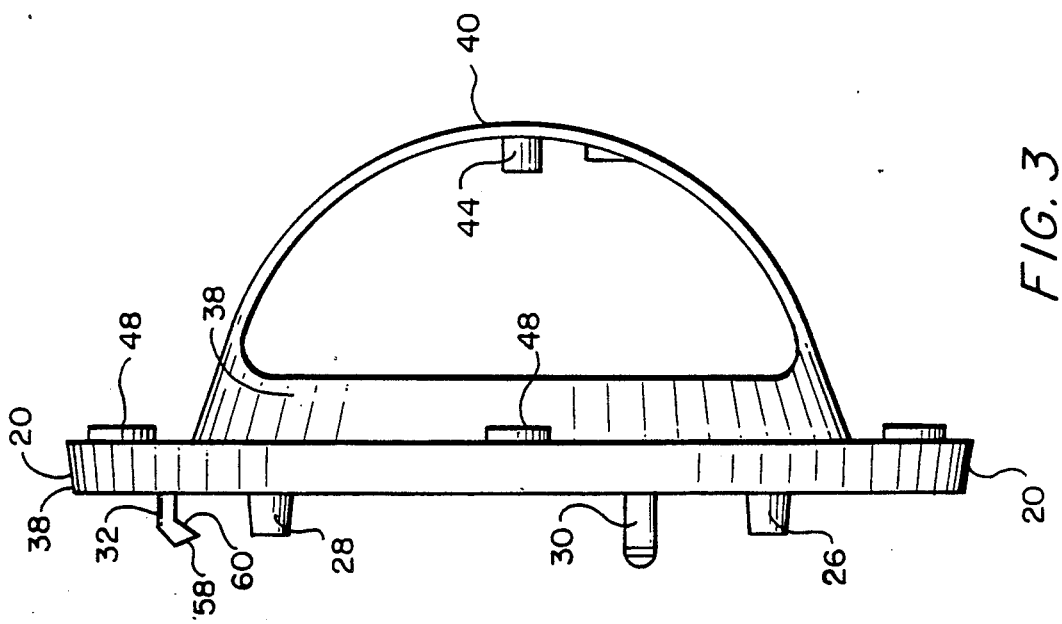
FIG. 3 is a side elevation.
Figure 7:
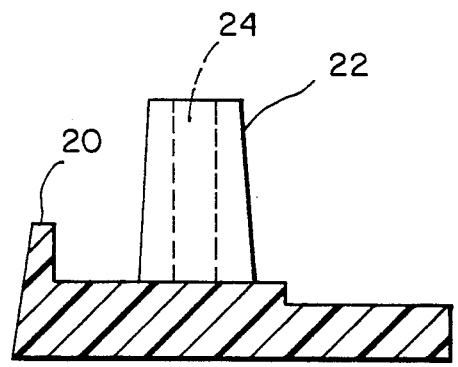
FIG. 7 is a vertical section, taken along section line 7—7 of FIG. 2.

As illustrated in FIGS. 3 and 5, top rim 20 includes an inner radially inwardly inclined edge 21.

Figure 8:
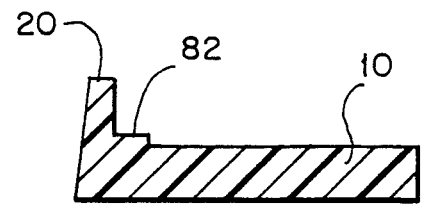
FIG. 8 is a transverse section, taken along section line 8—8 of FIG. 2.

As illustrated in FIG. 8, rim 20 may include an inner shoulder 82 for support of the edges of the gasket 62 having aligning apertures 70, 73, and 74. Similar support surfaces are provided for bosses 92, 94, 96, 98. As illustrated in FIG. 3, the underside of shaped body 16 may include a series of elevated seats 48 for securement of the stove bolts extending through the lamp cover.

In FIG. 5, lamp 64 is shown as including an outer cover 71 and bulbs 66 and 68 protected by a rearwardly and diametrically extending strap radius 40. Strap 40 is eliminated in the modification shown in FIG. 9.

In FIG. 9, bulb 64 is supported means of the tab inclined shoulders 58' as well as the abutment of the bulb retaining flange 72' with a modified inner rim 76 having inwardly and radially extending shoulder 77 with inclined surface 80 engaging the curvate surface of the bulb exterior.

As will apparent, applicant's structure provides a lens fitting with all of the durability, alignment and sealing functions of WARNING LIGHT ASSEMBLY disclosed in his earlier U.S. Pat. No. 3,968,358. However, these functions are performed with a more economically manufactured fitting structure which facilitates testing of the bulb and bulb removal due to the open back configurations, as disclosed in FIGS. 2 and 9.

I claim:

1. A fitting for a vehicular warning lamp comprising in combination:
   a) an annular body defining on its top surfact a circular rim adapted for supporting a lens cover superstructure and defining at its bottom a circular flange for supporting a general surface sealed beam light lamp of the type having a circumferential lamp seal defining an upper retaining flange and a lower seating plane surface; and a convex support strap extending outwardly and diametrically from the top to the bottom of said circular flange; and
   b) a lens superstructure comprising concave inner and outer surfaces teminating at an annular lens mounting surface, said lens superstructure further comprising a plurality of bosses formed extending from the periphery of said annular lens mounting surface wherein at least one of said bosses is a combination boss, including a bulb locating surface spaced apart from said circular rim, whereby when said annular lens mounting surface is held against said lower seating plane surface said bulb locating surface is proximated said upper retaining flange, wherein said top circular rim includes a plurality of individual integrally formed tabs, each tab comprising an elongated shaft extending substantially normally away from said circular rim and with an inwardly directed projection surface on the distal end of said elongated shaft for complemental engagement with the upper retaining flange of a lens sealing rim.

* * * * *